May 20, 1941.    T. TAKENOUCHI    2,243,021

SQUIRREL CAGE ROTOR OF INDUCTION MACHINES

Filed Dec. 16, 1938

INVENTOR,
T. Takenouchi
BY
Glascock Downing & Seebold
ATTORNEYS.

Patented May 20, 1941

2,243,021

UNITED STATES PATENT OFFICE 2,243,021

SQUIRREL CAGE ROTOR OF INDUCTION MACHINES

Toshitaro Takenouchi, Shinagawa-ku, Tokyo, Japan

Application December 16, 1938, Serial No. 246,225
In Japan December 18, 1937

4 Claims. (Cl. 172—120)

My present invention relates to improvements in squirrel-cage rotors of induction machines, including an inner end ring or rings and outer end rings, the former arranged within an iron core forming a low resistance circuit with conductive cage bars, the latter being arranged outside the iron core forming a high resistance circuit with the same or other conductive cage bars, and having the characteristics of a double squirrel-cage rotor.

The main object of this invention is to obtain a double squirrel-cage induction machine of small size providing a saving of materials used to make the core or conductors.

Figure 1:
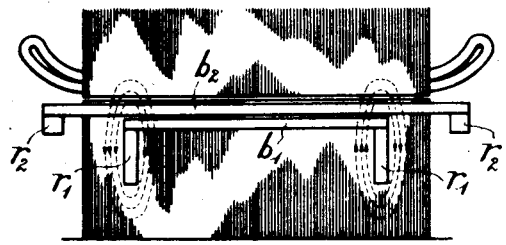
Figure 2:
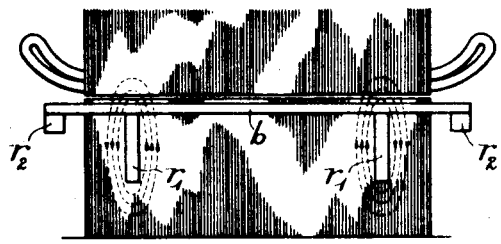
Figure 3:
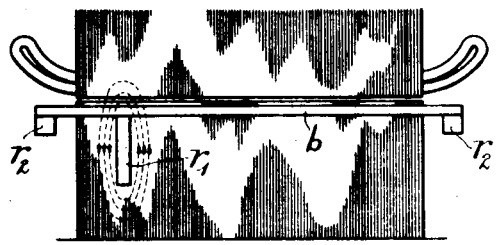

My present invention is illustrated in the accompanying drawing showing some embodiments of this invention, in which:

Fig. 1 shows an improved squirrel-cage rotor of an induction motor with its stator, Fig. 2 shows other improved squirrel-cage rotor of an induction motor with its stator, Fig. 3 shows another improved squirrel-cage rotor of an induction motor with its stator, and in this drawing dotted lines show leakage magnetic flux, and the same reference illustrates the identical portion.

In Fig. 1 the rotor of squirrel-cage type is provided with a pair of inner end rings $r_1$ and a pair of outer end rings $r_2$, the former are arranged symmetrically within the iron core and the latter are arranged symmetrically at the ends of said core. Between these pairs of rings the inner conductive cage bars $b_1$ or the outer conductive cage bars $b_2$ are bridged respectively. The squirrel-cage rotor shown in Fig. 2 is also provided with a pair of the inner end rings $r_1$ and a pair of the outer end rings $r_2$, and these rings are connected by common conductive bars $b$. In Fig. 3 the squirrel-cage rotor is provided with one inner end ring $r_1$ within its iron core, while the outer end rings $r_2$ are arranged symmetrically at the ends of the rotor and all of these rings are connected by common conductive bars $b$.

In each case, the resistance of the circuit including the outer end rings is so designed as to be higher than that of the circuit including the inner end rings. For this purpose the resistance of the outer end rings is higher than that of the inner end rings, while in the rotor in Fig. 3 it is convenient to provide the right outer end ring with lower resistance than that of the left outer end ring, and it is possible to make the bars between inner end rings or some parts of them bigger or numerous than others. At these junctures it is necessary that the inner end rings are situated at suitable positions except the center of the core.

In these induction motors at the starting period high reactance is created in the inner end ring circuit and the secondary current is induced in the high resistance circuit which includes the outer end rings, and during the running period when the speed of the motor rises and the frequency of the magnetizing flux decreases, the secondary current is mostly induced in the low resistance circuit which includes the inner end rings.

From this construction, it is possible to make the slots for the conductive bar shallow, the diameter or the size of the rotor small, and to save materials in forming the iron core and the conductive parts. The rotor is easily constructed by die-casting the conductive parts to the core, and the same conductive cage bars are active at any period of starting or running of the motor.

While I have shown my invention by way of some examples, it will be obvious to those skilled in the art that it is not thus limited, but is susceptible of various other changes and modifications without departing from the spirit thereof, and I desire, therefore, that only such limitations shall be placed thereupon as are imposed by the prior art or as are specifically set forth in the appended claims.

I claim as my invention:

1. A squirrel-cage rotor of an induction machine comprising, a core of substantially the same axial length as a stator for the machine, inner end rings and outer end rings, said inner rings being embedded within said core, bars connecting said inner rings forming a low resistance circuit, said outer rings being arranged outside said core and connected by said bars forming a high resistance circuit.

2. A squirrel-cage rotor of an induction machine according to claim 1 characterized by the resistance of the outer end rings being higher than that of the inner rings.

3. A squirrel-cage rotor of an induction machine comprising, a core of substantially the same axial length as a stator for the machine, outer end rings and one inner end ring, said outer rings being arranged adjacent the ends of the core, bars connecting said outer rings forming a high resistance circuit, said inner ring being embedded within said core at a point removed from the center and connected to said bars forming a low resistance circuit.

4. A squirrel-cage rotor of an induction machine according to claim 3 characterized by one outer end ring having a different resistance characteristic than that of another outer end ring.

TOSHITARO TAKENOUCHI.